United States Patent [19]
Maiocchi

[11] Patent Number: 5,169,729
[45] Date of Patent: * Dec. 8, 1992

[54] BEADS OF PNEUMATIC TIRES FOR VEHICLE WHEELS

[75] Inventor: Luigi Maiocchi, Moncucco, Italy

[73] Assignee: Pirelli Coordinamento Pneumatici S.p.A., Milan, Italy

[*] Notice: The portion of the term of this patent subsequent to Apr. 16, 2008 has been disclaimed.

[21] Appl. No.: 623,569

[22] Filed: Dec. 7, 1990

Related U.S. Application Data

[62] Division of Ser. No. 183,639, Apr. 19, 1988, Pat. No. 5,007,471.

[30] Foreign Application Priority Data

Apr. 28, 1987 [IT] Italy ................................ 20293 A/87

[51] Int. Cl.$^5$ .............................................. B60C 15/04
[52] U.S. Cl. ..................................... 428/589; 428/599
[58] Field of Search ....................... 428/589, 599, 606; 152/527, 540; 245/1.5; 403/383; 57/201, 237, 902

[56] References Cited

U.S. PATENT DOCUMENTS

| | | | |
|---|---|---|---|
| 338,913 | 3/1886 | Batchelor | 57/216 |
| 1,492,256 | 4/1924 | Maranville | 152/540 |
| 1,503,985 | 8/1924 | Corson | 245/1.5 |
| 1,561,684 | 11/1925 | Beyza | 245/1.5 |
| 2,050,298 | 8/1936 | Everett | 428/606 |
| 3,949,800 | 4/1976 | Lejeune | 152/540 |
| 4,406,317 | 9/1983 | Merten | 152/540 |
| 4,681,307 | 7/1987 | Leonard | 403/383 |
| 4,733,708 | 3/1988 | Kindry et al. | 152/527 |

FOREIGN PATENT DOCUMENTS

| | | |
|---|---|---|
| 200017 | 3/1958 | Fed. Rep. of Germany . |
| 1918224 | 7/1970 | Fed. Rep. of Germany . |
| 8033602.3 | 3/1986 | Fed. Rep. of Germany . |
| 1251403 | 12/1960 | France . |
| 1281439 | 12/1961 | France . |
| 2049245 | 3/1971 | France . |
| 2220346 | 10/1974 | France . |
| 2383776 | 10/1978 | France . |
| 2390300 | 12/1978 | France . |
| 2119323A | 11/1983 | United Kingdom . |

Primary Examiner—John Zimmerman
Attorney, Agent, or Firm—Stevens, Davis, Miller & Mosher

[57] ABSTRACT

The metal core used for reinforcing tire beads is constituted by a plurality of coils of wire (16), (17), (18), axially arranged side-by-side and radially superimposed, in which the wire has a cross section of modular shape with two equal and parallel opposite sides (1), (2), the profiles (15) of the corresponding ends of the opposite sides having a distance, from the axis of said pair of sides, whose value varies from one side to the other, said variation comprising at least one symmetrical deviation along, the development of its cross sectional profile.

4 Claims, 2 Drawing Sheets

BEADS OF PNEUMATIC TIRES FOR VEHICLE WHEELS

This is a divisional of application Ser. No. 183,639 filed Apr. 19, 1988 (now U.S. Pat. No. 5,007,471 issued Apr. 16, 1991).

BACKGROUND OF THE INVENTION

The present invention concerns pneumatic tires for motor vehicles and more specifically it relates to their beads, namely to the annular portions of the tire carcass which have the task of anchoring the tire on the wheel rim upon which it is mounted. More precisely the invention refers to the reinforcing annular elements inserted in the beads, which are commonly defined as bead cores and an assembled core ready to be placed in a tire, known as a "bead core package" or ring.

The various types of wheel rims for tires are so widely known that there is no need of describing them in the present specification; it is sufficient to point out that they are provided at their tire bead mounting positions with two or more less conical coaxial surfaces, representing the supporting base for the tire beads; these surfaces terminate in a flange, radially projecting outward, which is intended to support the axially outer surface of the bead and against which the latter abuts by virtue of the tire inflation pressure.

Proper positioning of the bead into its seat is ensured by the conical shape of the bead seat in cooperation with the reinforcing metal bead core. This core is circumferentially inextensible having therefore a constant diameter, which is contained in the tire bead; the tight fit of the tire bead on the conically tapered bead seat, created by the axial thrust which is exerted on the bead side, from the inside out, on account of the tire inflation pressure, ensures the anchorage of the tire on the rim during use and in tubeless tires, also the air tightness between tire and rim to prevent a progressive deflation of the tire.

It is known that a tubeless tire, namely a tire not provided with inner tube, must be assembled on the so-called grooved rims, i.e. one-piece rims in which the bead are considerably conical (15° with respect to the axis of rotation of the rim); also, it can be understood that, to assemble the tire on the rim and to remove it therefrom, the tire bead must step over the rim flange which has a diameter greater than the radially inner diameter of the core. To carry out this operation, the core must be flexible, that is capable of deformation and in particular it must take an elliptical configuration (ovalization) which enables it to step over the rim flange in consequence of the diameter increase which takes place at the greater axis of the ellipse.

The solution of this problem proves particularly difficult in respect of large-size single-core tires, owing to the relevant geometrical size of the cores. In fact, it is evident that cores made of rubberized wires, like those at present used for large-size tires, after the tire curing becomes rigid and extremely compact structures, which are therefore scarcely flexible. For tires of this kind, provision was therefore made of cores composed of bare wires, able to displace circumferentially with respect to one another and consequently to allow the deformation and in particular the ovalization of the core even in the cured tire. These cores are built up in two different versions, namely one having a circular section, commonly known as "cord", made of a single wire of circular section helically wound up in several coils around a central element, and one of quadrangular straight section, obtained by means of a metal strap having quadrangular straight section with at least two opposite sides parallel to each other.

However, these cores show some disadvantageous characteristics both as regards their construction and as regards their employment.

As to the cores of the "cord" type, their section proves substantially inadequate in view of their use in tubeless tires, since—besides having a certain circumferential elongation it has little resistant to torsional stresses and consequently is unable to ensure the anchorage of the tire bead on the rim during operation, which is a substantial condition necessary to maintain the regular inflation pressure and to safeguard the structural integrity of the tire.

The "metal strap" type cores are made by winding up on an appropriate drum, in several radially superimposed turns, a plurality of straps arranged side-by-side, so that the final core is constituted by a plurality of coils in side-by-side relationship, but not linked to one another. Further, to impart to the base of the finished core the inclination of 15° on the horizontal plane (core axis), which is strictly necessary to use the core in tubeless tires, the metal strap is appropriately pre-shaped before being wound up on the drum and is then wound up on it with its side facing the drum already inclined by 15°.

Clearly, this production system involves a more complicate machinery and increases costs: further, the obtained core shows by itself an insufficient resistance to the stresses exerted onto it during the tire moulding and in operation, so that the necessary compactness of its section, and consequently its stability and torsional strength can be obtained and maintained only if the core body, that is the straps package, is kept closed and compact by a set of metal strips or check elements wound up around the package and circumferentially arranged in spaced relationship along the circumferential development of the core in order to prevent any relative displacement between the straps both in axial and in radial direction. Also this expedient involves obviously additional costs and complications.

Besides this, in order to achieve a greater compactness of the core to ensure the stability of its shape during the tire moulding and to maintain the integrity of the bead in course of time, the metal core was embedded in a kern of very hard elastomeric material, having a substantially circular section and covered in turn with a sheet of elastomeric material of still higher hardness so as to create a closed tubular envelope within which is embedded the metal core; in fact, only in this way was it possible to prevent the tears in the elastomer material and the detachments of said material from the core metal surface which—in other cases—unavoidably place during the tire operation on account of the torsional stresses acting on the bead, an example of such a construction is shown in U.S. Pat. No. 3,949,800 to Lejeune.

SUMMARY OF THE INVENTION

The present invention aims at providing a new core of the metal strap type, intended to be used in particular in large-size tubeless tires, which possesses all the advantageous characteristics of flexibility and elastic deformability of the conventional cores but is devoid of the above indicated inconveniences related thereto.

Accordingly, the subject matter of the present invention is a circumferentially inextensible annular metal core for reinforcing the beads of pneumatic tires for vehicle wheels, said core comprising a package of coils of wire, radially superimposed and axially arranged side-by-side with respect to one another, and a plurality of check elements, situated along the peripheral development of said reinforcing core, each of which is closed as a ring around the package of coils, the core being characterized in that the metal wire forming the coils is generally a parallelogram in cross-section and has a straight section comprising two rectilinear and parallel opposite sides, the corresponding ends of said sides being connected by a profile having a distance which is varaible with respect to a pre-established straight line perpendicular to said pair of sides, said variation comprising at least one symmetrical deviation along the development of the profile.

According to a preferred embodiment of the invention, the distance of said profile from the straight line perpendicular to said pair of opposite and parallel sides varies from a minimum to a maximum value and again to a minimum value by passing from one side to the other and in particular this is obtained by means of a profile symmetrical with respect to a straight line parallel to and equally spaced from said opposite sides, the profile being preferably in the form of a broken or non-rectilinear line of two sides or of a substantially sinusoidal curvilinear line.

In particular, the straight section of the wire is a modular element. The coils axially arranged side-by-side are radially offset from one another by a quantity corresponding to one half the distance between said pair of opposite sides, while the radially inner free edges of the side-by-side coils lie on a line inclined by 15° with respect to the core axis; the radially superimposed coils are constituted by a continuous metal strap wound up on itself.

BRIEF DESCRIPTION OF THE DRAWINGS

The present invention will be better understood from the following description and from the attached drawings, both given only by way of example and therefore not restrictive, where.

DESCRIPTION OF THE PREFERRED EMBODIMENTS

Figure 1:
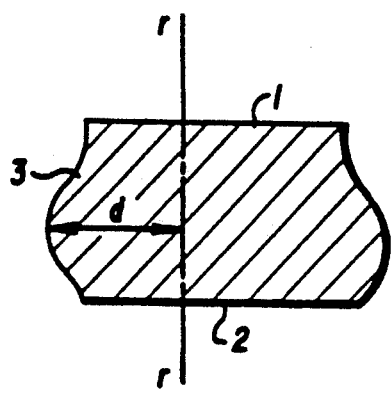
FIG. 1 illustrates a cross-sectional view of a wire according to the invention.

FIG. 1 shows the straight section of a metal wire of the type defined as "metal strap", used to build up—in accordance with the invention—the reinforcing elements of the tire beads, i.e. the so-called "cores", in particular those to be used in large-sized tubeless tires comprising only one core.

The section of said wire, generically in accordance with the invention, shows two opposite and parallel rectilinear sides (1) or base-sides, one being axially inward and the other being axially outward and each having two axial ends or extremities 30 and 31 and (2) and a nonrectilinear end profile (3) which connects the corresponding ends of said pair of rectilinear sides. According to the invention, taking as a reference a straight line "r" perpendicular to said pair of sides (1) and (2), the distance "d" of the profile from said straight line varies along the profile development and said variation between the two end points of the profile shows at least one inversion or deviation of value; in other words said distance at first increases and then decreases, or vice versa, at least once.

Figure 2:
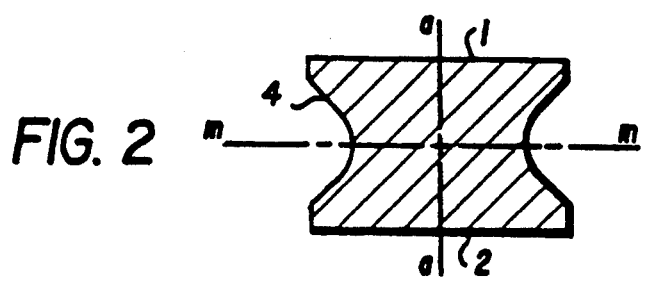
FIG. 2 illustrates a cross-sectional view of a profile symmetrical with respect to the median line of the wire section.

FIG. 2 illustrates a less generic embodiment of the invention according to which the opposite and parallel rectilinear sides (1) and (2) are also equal to each other, so that axis a-a of said pair of sides (1) and (2) can now be taken as reference straight line "r", while the connection profile (4) is symmetrical with respect to the median line m-m of the section.

Figure 3:
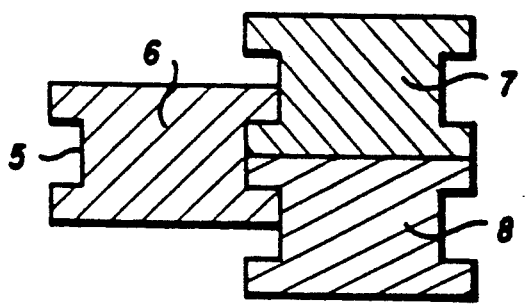
FIG. 3 shows a cross-sectional view of a wire of the modular type.

FIG. 3 illustrates a still more advantageous embodiment of the invention, in which non-rectilinear profile (5) connecting the rectilinear opposite sides (1) and (2), besides being symmetrical with respect to the median line m-m (not shown), is the same for both sides of the strap and is of a modular type; in other words several straps (6), (7), (8), all having the same straight section, can be exactly coupled together so as to give rise to a unit constituted by many equal and distinct elements (modular elements) in which the straight section is compact, i.e. does not comprise hollow spaces or interferences and has an area corresponding to the sum of the section areas of the components, namely of the individual straps forming the core.

The strap illustrated in FIGS. 1, 2 and 3 is shown to explain the invention in detail but does not have an optimum section, since the non-rectilinear profiles (5) connecting the ends of the parallel sides are difficult and troublesome to obtain and, for instance those of convex shape represented in FIGS. 2 and 3 require complicated systems to wind up the strap on the drum, it being impossible—owing to interferences in radial direction which might take place between the strap edges—to obtain coils axially arranged side-by-side and radially superimposed by carrying out the winding operation only by means of the rotation of the building drum.

Figure 4:
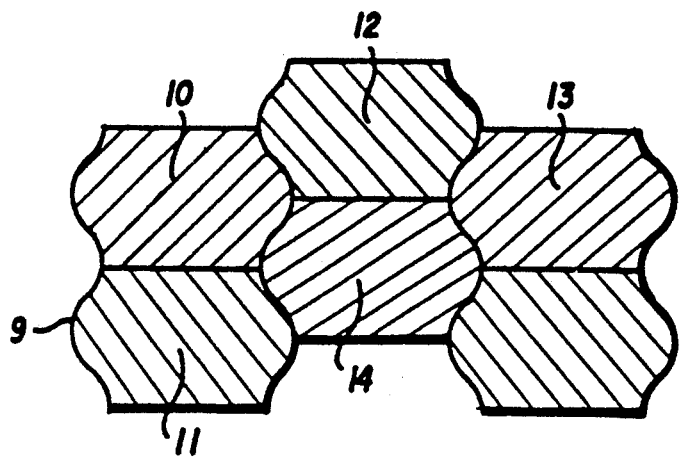
FIG. 4 shows a cross-sectional view of a preferred embodiment of a wire according to the invention.

FIG. 4 illustrates instead a more convenient embodiment of the strap, obtained according to the principle of modularity, in which the non-rectilinear profile (9) connecting the opposite and parallel rectilinear sides is substantially sinusoidal and consequently facilitates the fitting of the straps arranged side-by-side (10)-(14) and at the same time allows an expedite performance. From said Figure it is evident that, by arranging conveniently the straps in side-by-side relationship, a flat-base core can be easily obtained.

Figure 5:
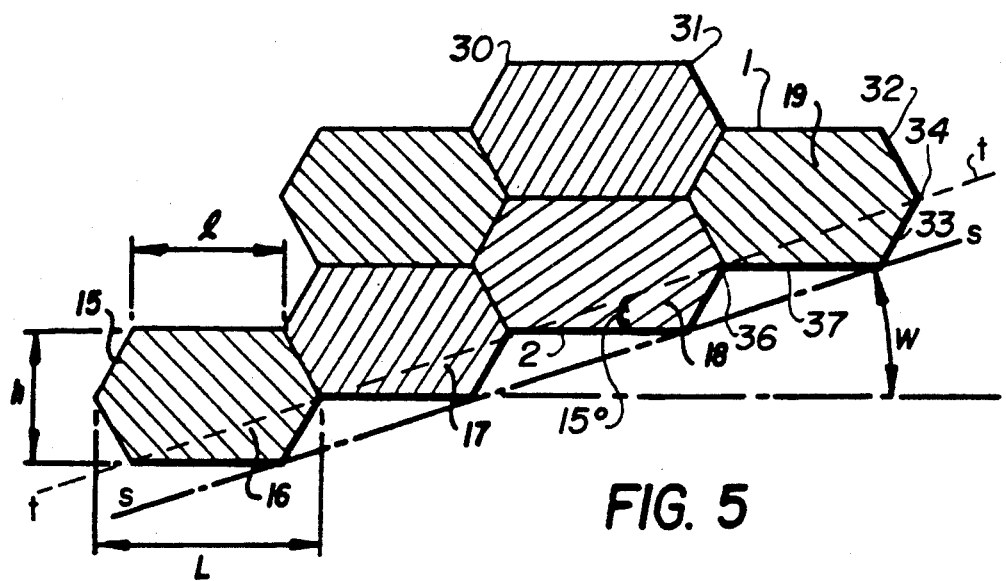
FIG. 5 shows a cross-sectional view of a second preferred embodiment of the invention.

Another advantageous embodiment of the strap according to the invention is shown in FIG. 5, where non-rectilinear profile (15) connecting the opposite and parallel rectilinear sides (1) and (2) is represented by a broken line of two sides, projecting axially outward with respect to said pair of sides, so that the strap has a substantially hexagonal section, which can be easily and economically carried out by means of the present technology regarding wire processing and drawing. In other words, as to the remaining four sides of the elongated hexagon, that is the short sides, each short side is formed by two generally radially extending rectilinear lines 32 and 33, lying at an angle to each other and joined together at an angle to form a generally non-rectilinear V shaped line with the apex 34 therebetween being axially outwardly extending. Thus there are a plurality of axially elongated hexagons as shown in FIG. 5 wherein an imaginary line t connecting one axial end 36 of the radially inward elongated base 37 and the apex 34 will lie at an angle of 15° with respect to the base 37. Also this section is modular and facilitates the mutual fitting of a plurality of straps, axially arranged side-by-side. It is clear that in this case one coil of radially superimposed straps will be radially offset with respect to an axially adjacent similar coil of radially superimposed straps by a portion equal to one half the strap thickness.

Figure 6:
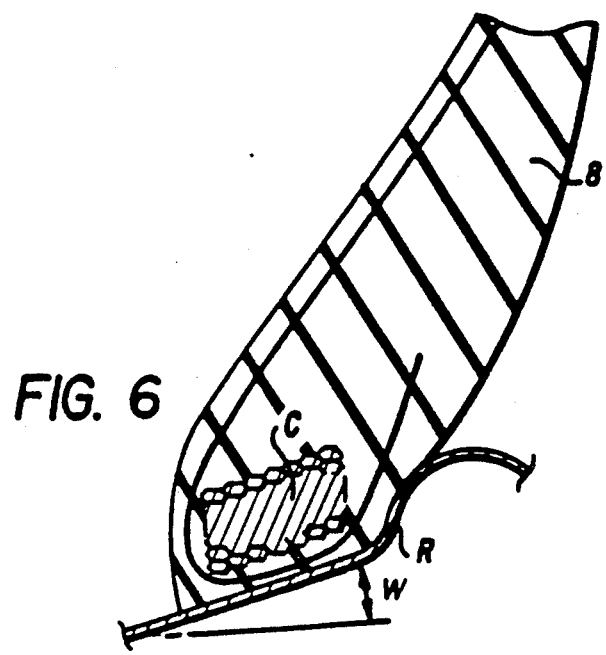
FIG. 6 illustrates a cross-sectional view of the assembled bead of a tubeless tire provided with the core according to the invention, obtained with the strap of a cross section as in FIG. 5.

FIG. 6 illustrates the bead B of a large-size tubeless tire, provided with a core C built up with the strap of hexagonal section shown in FIG. 5, and assembled on a grooved rim R with the bead supporting surface inclined, with respect to the line parallel to the rim axis, by an angle "w" of 15°. As shown in FIG. 6 the carcass ply reinforcing cords 22 are turned up around the bead core in a direction to run from the axial inside to the axial outside thereof.

In other words, as clearly shown in FIGS. 5 and 6, each tire bead has a circumferentially inextensible annular metal bead core package for reinforcing its bead area for mounting on a wheel rim R. The bead core package has an overall cross-section generally in the shape of a parallelogram having a base extending in a generally axial direction but inclined at a predetermined angle W, preferably 15°, with respect to the axis of rotation of the tire. The bead core package is made up of a plurality of radially superimposed coils of straps 16-19, the coils being arranged axially side-by-side. The strap or wire out of which the coil is wound has a generally rectangular cross-section with two parallel axially extending rectilinear opposite sides 1 and 2 that contact similar sides of a radial adjacent strap in the radial stack.

The other two sides of each generally rectangular wire or strap are non-rectilinear and extend generally radially to form a profile 15 for interengagement with an axially adjacent coil of straps that is arranged side-by-side. The non-rectilinear profile 15 may be curvelinear as shown in FIGS. 1, 2 and 4 or the profile 15 may be the short sides of a flattened hexagon as shown in FIGS. 5 and 6. In either case the profile 15 is symmetric to the corresponding profile on the other side, and this symmetry may be in relation to a line "r", see FIG. 1, extending perpendicular to the parallel sides 1 and 2. In any case the profile 15 has a portion that projects axially outwardly so as to fit between two similar projecting portions in an axially adjacent strap. Usually this projecting portion of the profile will fully contact two similar profiles of an axially adjacent stack except of course in a strap that is one the outer periphery of the bead coil package, in which case there may be no contact by one of the profiles or only a partial contact.

In the arrangement of this invention, as shown in FIGS. 5 and 6, the coils are radially offset with respect to each other because of the projections on two profiles 15, when radially stacked, form an indentation that is symmetric with the projection of a profile of an axially adjacent coil. The resulting interfitment holds the side-by-side coils in a radial offset position with respect to each other. The profile of one strap contacts only a portion of an adjacent strap; in other words it takes two axially adjacent profiles to form the indentation.

It is now evident that, if the values of L, l and h of the straight section of the strap (FIG. 5) are appropriately selected, the radially inner edges of the straps axially arranged side-by-side which are free, i.e. are not in contact with other straps, are all aligned on a straight line "s", also inclined by 15° with respect to the axis of the core, as shown in FIG. 5.

The advantages afforded by the core forming the object of the invention are many and relevant.

First of all, like the conventional ones, the core is built up by winding up a plurality of straps ((16)-(19) in FIG. 5), each in several superimposed coils, on an appropriate drum to which they are fed in mutual side-by-side arrangement.

However, as the side-by-side arranged coils remain blocked with respect to the mutual radial displacements (owing to the particular profile of axially extending projections on the sides of the strap which connects the opposite and parallel sides of the strap) and are therefore able to provide a core base having a permanent inclination of 15°, the pre-shaping of the wire becomes quite useless, so that also the surface supporting the building drum is simpler in processing, being it represented by a series of steps having a cylindrical, and not conical, radially outer surface.

Figure 7:
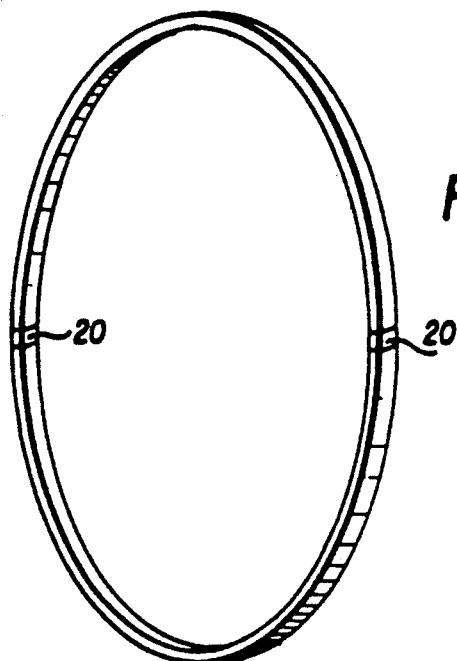
FIG. 7 represents in perspective view a finished core provided with check elements to maintain the compactness of the package of metal coils.

Being not subjected to pre-shaping operations, the core is devoid of internal tensions and therefore is not affected by forces which tend to disarrange the geometry of its section; moreover, the core section, provided with straps mutually fitting together, is naturally stable and extremely resistant to torsional stresses, so that the section compactness can be easily maintained and ensured even when the core is to be assembled in the tire carcass and during the tire moulding and curing only by means of a reduced number of suitable check elements, as the strips (20), illustrated in FIG. 7, which are wound up around the kern, i.e. the package the straps, and are situated circumferentially along the peripheral development of the core at a few points, for instance only at two points in diametrically opposite position. The straps, which are not to bear excessive stresses owing to the peculiar stability of the section, can be made of any suitable material, for instance also of a material not resistant to compression.

Further, it is evident that, in spite of the axial interconnection between the sections of the straps arranged side-by-side, each strap is given the possibility of mutual circumferential movements with respect to the other straps, so that the core maintains in the largest extent the characteristics of flexibility and deformability (ovalization) typical of the best conventional cores, affording in this way a considerable technical and economical improvement in the present tire technology.

As regards the bond with the elastomeric material in which the core is embedded, the value of said bond is extremely high and stable in course of time. In fact the core according to the invention, by virtue of the particular straight section of the strap, has two main advantages. First of all the core surface is well articulated; the core profile, considered on the straight section, shows projections (vertices of the hexagons) in axial position and steps in radial position. The whole formed by projections and steps is such as to create a series of joints between the surface of the metal core and the elastomeric material embedding it; the result is a very high resistance to the torsional stresses applied to the bead, which tend to detach the elastomeric material from the metal.

Moreover, the projections and the steps increase in a considerable way the area of the core surface, without substantially modifying the area of the resistant section (straight section) of the metal in comparison with that of the conventional cores of quadrangular section; since the area of the resistant section is dimensioned according to the entity of the stresses (tension and torsion) applied to the core, it can be understood that—under an equal stress—a greater surface of contact with the elastomeric material means a lesser specific strain per unit of surface ($Kg/mm^2$) acting on the rubber/metal interface.

The combination of these favorable characteristics eliminates substantially the risk of tears in the elastomeric material and of detachments in the rubber/metal bond, so that it is no longer necessary to embed the annular core in the kern covered by specific elastomeric materials of high hardness; on the contrary, the core in accordance with the invention can be embedded in the tire bead by the usual methods of assembly used for the conventional rubberized cores.

It should be understood that the present specification is solely given by way of non-limiting example, so that the present invention includes in its scope any other modification and variation which, although not expressly described herein, is easily deducible from the above indicated inventive idea.

I claim:

1. Metal strap for forming a circumferentially inextensible annular core for reinforcing a pneumatic tire bead, said core comprising a tightly packed package of coils made from said metal strap which are radially superimposed and axially arranged side-by-side with respect to one another, said radial and axial directions being in respect to the axis of rotation of said tire bead, said strap comprising an elongated metal body approximately elongated hexagonal cross section, with two substantially axially extending, equal, parallel and opposite base-sides, the outer extremities of each base-side of said cross section being connected by a substantially radially extending profile, said profiles projecting axially outward with respect to said base-sides, characterized by the fact that the maximum axial length L of the cross section, the length l of the base-side and the section height h are appropriately selected in such a way as to form, when placed in a contiguous side-by-side arrangement of a plurality of straps, a bead core having a cross section approximately in the shape of a parallelogram with approximately axially extending sides of said parallelogram being inclined at an angle of about 15° with respect to the base-side of said strap.

2. The strap of claim 1, in which the radially extending profiles at the axial ends of the base-sides are mirror images of each other.

3. The strap of claim 1 in which each said radially extending profile comprises two rectilinear lines lying at an angle to each other.

4. The strap of claim 3 in which said rectilinear lines are symmetrically inclined with respect to said base-sides.

* * * * *